(12) United States Patent
Anzil

(10) Patent No.: US 6,449,485 B1
(45) Date of Patent: *Sep. 10, 2002

(54) TECHNIQUE FOR MOBILE WIRELESS DEVICE LOCATION

(75) Inventor: Claudio Anzil, Carlsbad, CA (US)

(73) Assignee: International Business Machines Corporation, Armonk, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/235,627

(22) Filed: Jan. 22, 1999

(51) Int. Cl.⁷ .............................. H04Q 7/20; G01S 5/00
(52) U.S. Cl. .................. 455/456; 455/521; 342/357.06; 342/450
(58) Field of Search ................................. 455/517, 521, 455/456, 404; 342/357, 450, 457; 701/213, 214, 215

(56) References Cited

U.S. PATENT DOCUMENTS

| | | | |
|---|---|---|---|
| 4,521,918 A | * 6/1985 | Challen | ...................... 455/343 |
| 5,225,842 A | 7/1993 | Brown et al. | |
| 5,311,194 A | 5/1994 | Brown | |
| 5,379,224 A | 1/1995 | Brown et al. | |
| 5,717,403 A | * 2/1998 | Nelson et al. | ............... 342/357 |
| 5,751,244 A | 5/1998 | Huston et al. | |
| 5,760,909 A | 6/1998 | Nichols | |
| 5,764,184 A | * 6/1998 | Hatch et al. | ................. 342/357 |
| 5,767,788 A | * 6/1998 | Ness | ...................... 340/825.49 |
| 5,774,829 A | 6/1998 | Cisneros et al. | |
| 5,781,150 A | 7/1998 | Norris | |
| 5,781,156 A | 7/1998 | Krasner | |
| 5,786,773 A | 7/1998 | Murphy | |
| 5,786,790 A | 7/1998 | Abbott | |
| 5,787,384 A | 7/1998 | Johnson | |
| 5,797,091 A | * 8/1998 | Clise et al. | .................. 455/404 |
| 5,798,732 A | 8/1998 | Eshenbach | |
| 5,805,200 A | 9/1998 | Counselman, III | |
| 5,812,961 A | 9/1998 | Enge et al. | |
| 5,815,538 A | * 9/1998 | Grell et al. | .................. 375/356 |
| 5,825,327 A | 10/1998 | Krasner | |
| 5,828,336 A | 10/1998 | Yunck et al. | |
| 5,831,574 A | 11/1998 | Krasner | |
| 5,832,247 A | 11/1998 | Gildea et al. | |
| 5,835,907 A | * 11/1998 | Newman | ...................... 707/10 |
| 5,838,237 A | 11/1998 | Revell et al. | |
| 5,841,396 A | 11/1998 | Krasner | |
| 6,061,337 A | * 5/2000 | Light et al. | .................. 370/331 |
| 6,104,338 A | * 8/2000 | Krasner | ................. 342/357.06 |

OTHER PUBLICATIONS

Leick, Alfred, "GPS Satellite Surveying", 1990, pp. 204–217, John Wiley & Sons, Inc.

* cited by examiner

Primary Examiner—Edward F. Urban
Assistant Examiner—Erika A. Gary
(74) Attorney, Agent, or Firm—Blakely, Sokoloff, Taylor & Zafman LLP

(57) ABSTRACT

A method and apparatus of determining the position of a mobile communications device using retransmitted GPS data is described. In the invention, a timing apparatus in the mobile communications device is synchronized with a timing device in the base station. The mobile unit samples and time stamps received GPS signals for retransmission to the base station. The base station uses the time stamp to determine an approximate time when the GPS sample was received allowing a reduction in the amount of GPS sample data needed to compute a position of the mobile communications device.

16 Claims, 3 Drawing Sheets

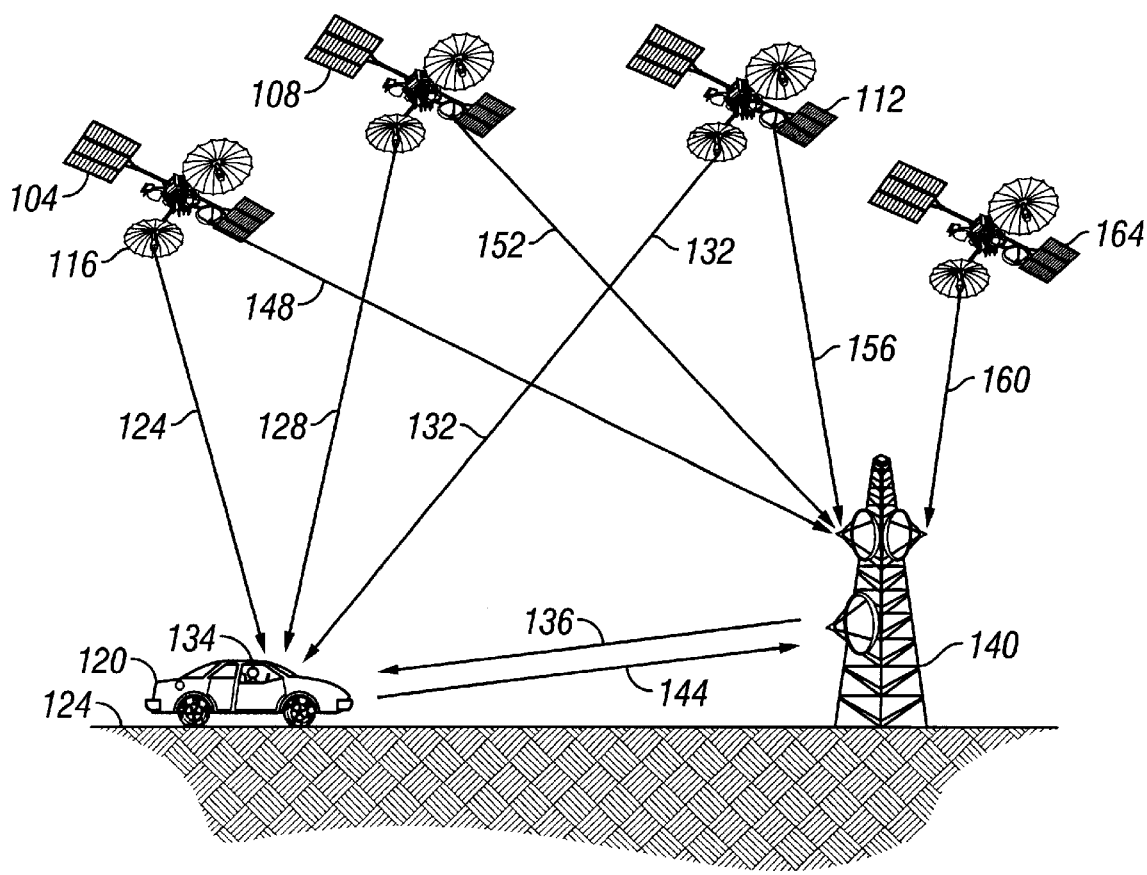
FIG. 1
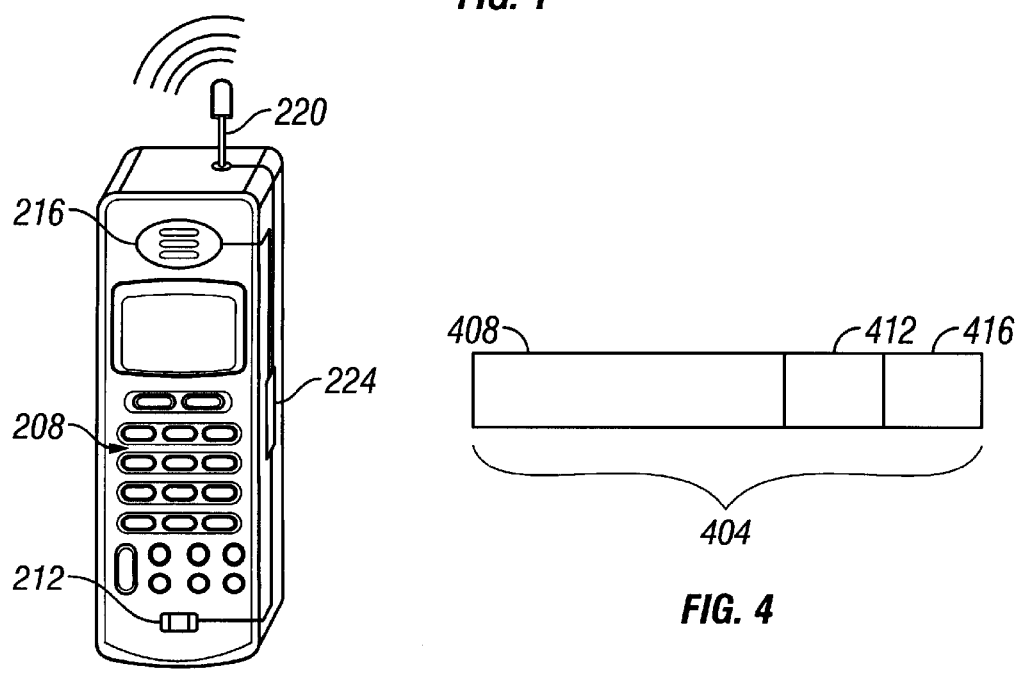
FIG. 2
FIG. 4

TECHNIQUE FOR MOBILE WIRELESS DEVICE LOCATION

BACKGROUND OF THE INVENTION

1. Field of the Invention

The present invention relates to determining the location of communications devices in a network communications system. More particularly, the present invention utilizes global positioning system (GPS) satellites to track cellular telephone positions in a cellular telephone network.

2. Description of Related Art

In recent years, cellular telephones have increasingly been used as a safety device to call for help when assistance is needed. However, the effectiveness of such systems has been reduced by the difficulty in identifying a caller's position. Presently, a caller recites in detail a location, such as an address, to guide emergency workers such as police, fire or medical personnel to the site where assistance is needed. In emergency situations, the caller may be unable to accurately identify a position. Furthermore, when a caller is moving, the position where assistance is needed keeps changing. Thus, a need exists for a system to automatically determine the location of a mobile communications device such as a cellular telephone placing a call.

Global positioning systems (GPS) are used to identify the location of objects. These systems frequently rely on complex circuitry to decipher codes transmitted by three or more GPS satellites which orbit the earth. Such complicated circuitry consumes battery power and adds to device cost, both undesirable attributes in a hand-held mobile telephone.

Determining an object location using GPS signals requires precise timing. GPS receivers measure the delay between a transmission of a GPS signal from a GPS satellite to a receiving of the GPS signal at a receiving unit to determine the distance from the receiving unit to the satellite. GPS satellites include accurate clocks and encode the time they begin transmitting each god unit of GPS data in each broadcast. The receiving unit records the time the signal is received. An elapsed time between signal transmission and signal reception divided by the propagation speed of the GPS signal determines the distance between the satellite and the receiving unit. By computing three distances or "pseudoranges" from three satellites such as satellites 104, 108, 112 of FIG. 1, the position of a receiving unit such as mobile communications device 134 can be determined.

One difficulty with GPS systems is that the satellite clock and a timing apparatus such as a receiving clock need to be carefully synchronized. GPS satellites carry both rubidium and cesium atomic clocks to maintain an accurate time frame. Although these clocks are very accurate, the atomic clocks are physically left to drift off a standard "GPS" time system. The amount of drift is typically kept within a millisecond. The drift is permitted because it is difficult to interfere with precise atomic clocks without introducing inaccuracies. However, the performance of the clock is carefully monitored by a centralized control center and the amount of drift is accurately known. The amount of drift is included in information broadcast by each GPS satellite. This error information is transmitted as a co-efficient of a second order polynomial given by:

$$DT = A_0 + A_1(T-T_0) + A_2(T-T_0)^2 \quad (1)$$

Where $T_0$ is a time epoch, $A_0$ is a satellite clock time offset, $A_1$ is a fractional frequency offset, and $A_2$ is a fractional frequency drift.

A second source of errors results from random drift characteristics. Random drift characteristics are not predictable, such random drifts are observable only over longer periods of time. When the base station does not receive signals directly from the GPS satellites, the longer periods of time increase the sample size needed from the cellular telephone. However, when the base station directly receives data from the GPS satellites, the base station can correct for random drift characteristic.

A receiving time is also needed to compute a pseudorange. The receiving time is the time at which the GPS signal is received. Various methods may be used to record a receive time including the use of an internal high quality quartz crystal clock or using external timing from an atomic standard clock. Alternately, when four GPS satellite signals are available, a four polynomial equation may be solved for four unknown variables, three variables representing position in three dimensional space and a fourth variable representing the time element. These four variables may be expressed in equations 2, 3, 4, 5 as follows:

$$P_k^1 = \sqrt{(u^1 - u_k)^2 + (v^1 - v_k)^2 + (w^1 - w_k)^2} + c\, dt_k \quad (2)$$

$$P_k^2 = \sqrt{(u^2 - u_k)^2 + (v^2 - v_k)^2 + (w^2 - w_k)^2} + c\, dt_k \quad (3)$$

$$P_k^3 = \sqrt{(u^3 - u_k)^2 + (v^3 - v_k)^2 + (w^3 - w_k)^2} + c\, dt_k \quad (4)$$

$$P_k^4 = \sqrt{(u^4 - u_k)^2 + (v^4 - v_k)^2 + (w^4 - w_k)^2} + c\, dt_k \quad (5)$$

$P_k$ is a psuedorange ($P_k$) which can be solved for the four unknown variables, $u_k$, $v_k$, $w_k$, $dt_k$ where ($u_k$, $u_k$, $w_k$) is the position of the $k^{th}$ GPS satellite (U, V, W) is the position of the receiving unit, $dt_k$ is time elapsed from transmission to reception, and c is the speed of light. A description of these equations is provided on pages 204 to 217 of a book entitled *GPS Satellite Surveying* by Alfred Leick published in 1990.

A second method of determining time of transmission and time of reception uses carrier phases. Alternately, Doppler phase shifts may be used. However, these techniques suffer from the difficulty in obtaining a correct cycle, commonly called a cycle ambiguity. Such techniques and the associated difficulties are described on page 209 to 217 of the book *GPS Satellite Surveying*.

U.S. patent application Ser. No. 5,379,224, entitled *GPS Tracking System* by Brown, et al., describes a low cost tracking system in which a GPS sensor samples a received GPS signal and re-transmits the samples to a central work station. The central work station described in Brown performs the GPS processing. However, the system described in Brown uses significant bandwidth to transmit sufficient data to enable an accurate position fix on the GPS sensor. The bandwidth allocated to each cellular telephone is limited.

Thus, there exists a need for a system which allows the cellular telephones to be located when an emergency arises, The system is preferably inexpensive, does not utilize significant cellular bandwidth, and is robust to handle changes in the need for GPS information when an emergency situation arises.

SUMMARY OF THE INVENTION

The present invention describes a system to track the position of a mobile communications device. The mobile communications device includes circuitry which receives and samples GPS signals from a plurality of satellites. An internal timing apparatus synchronized with a base station clock records the time at which the GPS signal is received. The mobile communications device transmits a packetized sample of the GPS signal and a time stamp indicating when the sampled GPS data was received to the base station. By utilizing the time stamp and the GPS data, a processing circuit in the base station determines the position of the mobile communications device.

BRIEF DESCRIPTION OF THE DRAWINGS

FIG. 1 illustrates an overview of a translated GPS system in a preferred embodiment of the invention.

FIG. 2 illustrates a mobile communications unit incorporating a preferred embodiment of the invention.

FIG. 4 illustrates one embodiment of a data frame containing a GPS data sample as utilized in the present invention.

DETAILED DESCRIPTION OF THE PREFERRED EMBODIMENTS

Figure 3:
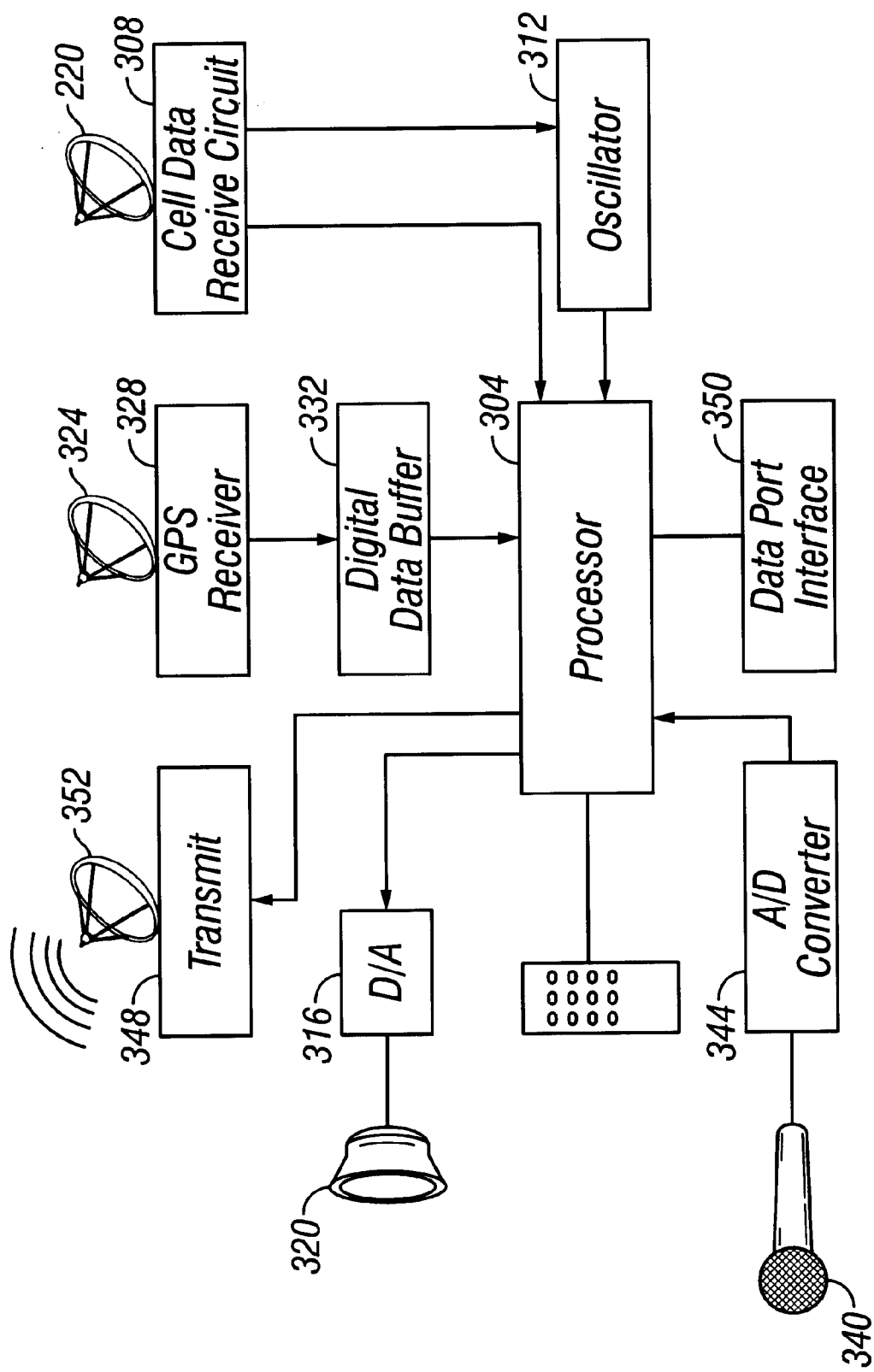
FIG. 3 illustrates a block diagram view of circuitry in the mobile communications unit.

The present invention describes a system in which a mobile communications device, e.g., a cellular telephone receives a GPS signal from a plurality of satellites, samples the GPS signal and transmits a number of samples of the GPS signal with a time stamp to a base station. The base station receives GPS signals directly from the satellites as well as samples of GPS data from the cellular telephone. The base station uses the time stamp to coarsely time align the sampled GPS data received from the cellular telephone with GPS data received directly from GPS satellites. Multiphase correlation of the sampled GPS data signals received from the cellular telephone is used to determine a position of the cellular telephone. The time stamp reduces the sample size of GPS data needed by reducing the uncertainty as to when the GPS data was received.

In the following description, certain details will be included to facilitate understanding of the invention. For example, the specification may describe the mobile communications device as a cellular telephone. Certain protocols used in cellular telephones such as GSM, PCS, CDMA, IS-136, and other well-known protocols will be described to illustrate possible implementations of the invention. However, it is to be understood that the invention should not be limited to the particular communications device, protocols or other details included herein, as other embodiments are possible while staying within the scope of the invention.

In a preferred embodiment, the invention minimizes the uncertainty of $dt_k$ of equations (2–5) by synchronizing to a given accuracy a clock in the base station with a timing apparatus in the receiving unit and transmitting time information in a time stamp. In traditional systems, a relatively large sample size was needed to enable correlation of a GPS signal from a mobile device because of the uncertainty in determining when the GPS signal was received. The use of the time stamp narrows the window which needs to be correlated ("searched"), thereby reducing the sample size needed. The reduced sample size reduces the bandwidth needed to transmit the GPS data conserving the bandwidth allocated to a cellular telephone.

In order to compute a position, a base station uses multiple correlators staggered in phase to operate on the sampled data transmitted from the cellular phone. In a preferred embodiment of the invention, the multiple correlators operate in parallel in conjunction with a phase and frequency tracking loop. The primary error contribution in acquisition is the clock frequency error between the base station and the mobile communications device. Current cellular network provides relatively accurate clock coherency (approximately 2 microseconds) between the base station and the mobile unit. Due to the relatively accurate clock coherency, time stamping data received by the mobile unit with a time stamp provided by the cellular network significantly reduces the uncertainty associated with when the data was received. By using the synchronized timing apparatus already present in current cellular networks, the cost of the system is minimized.

FIG. 1 illustrates the signal paths from a plurality of GPS satellites 104, 108, 112. Each GPS satellite, e.g., GPS satellite 104, includes an atomic clock 116 which maintains a very accurate reference GPS time. The GPS clock 116 may be periodically synchronized by a ground transmitter (not shown). Each GPS satellite 104, 108, 112 may be a portion of a GPS satellite system which may consist of a constellation of GPS satellites emitting navigation messages at two frequencies, an L1 frequency at 1,575.42 MHz and an L2 frequency at 1,227.6 MHz. These frequencies contain P codes and C/A codes which enable a receiving unit to compute the psuedorange, the distance between the satellite and the receiver and a corrective term for the receiver clock error.

A vehicle or other mobile unit 120 traveling along earth's surface 124 receives the GPS signals from GPS satellites 104, 108, 112 along transmission paths 124, 128, 132. A mobile communications device 134 such as a cellular telephone within the mobile unit 120 synchronizes a timing apparatus such as a receiving clock using a synchronization signal transmitted along signal path 136 from base station 140. The clock synchronization signal is typically part of an automatic frequency control (AFC) loop. A timing circuit adjusts an internal timing apparatus within the mobile communications device 134 to be tightly synchronized to a clock within the base station 140. In a GSM cellular network, the synchronization is within two microseconds. A signal output by the synchronized timing apparatus is used to time stamp when a sample of GPS data is received from GPS satellites 104, 108, 112.

Mobile communications device 134 samples the GPS signal from satellites 104, 108, 112 and packetizes the received GPS signal with a corresponding time stamp. The data packet including sampled GPS data and time stamp is transmitted along communications path 144. A preferred embodiment of transmitting a sampled GPS data with a time stamp will be described in FIG. 4. In the preferred embodiment, a low sample rate is used which allows for periodic determination of the location of mobile unit 120. Each packet of data is transmitted over a predetermined period of time to minimize bandwidth usage in communications between the mobile unit 120 and base station 140. In a preferred embodiment of the invention, base station 140 is a cellular site which includes the electronics used to transmit and receive voice communications from cellular telephones. Such a base station description is provided in the book "The GSM System for Mobile Communications" on pages 94–99.

As mobile communications unit device 134 receives GPS signals from satellites 104, 108, 112 along signal paths 124, 128, 132, base station 140 receives GPS signals from satellites 104, 108, 112 along signal paths 148, 152, 156. Base station 140 also tracks when the GPS data is received. It is observed that the mobile station and base station may track different GPS satellites. In a preferred embodiment, base station 140 indexes the received GPS data in a memory device according to the time the GPS data is received from the GPS satellite. When sampled data is received from the mobile unit 120, base station 140 matches the time stamp to indexed packets of GPS data stored in memory.

Matching time stamps to indexes removes significant time uncertainty and reduces the amount of data which needs to be transmitted from mobile communications device 134 for a given acquisition time. Lower uncertainty reduces the amount of data which needs to be communicated to the base station 140 via transmission path 144 conserving bandwidth for other data and cellular communications. For example, in a preferred embodiment of the invention, the rate of the GPS data transmission averages approximately 1.4 k bits/sec during normal operation. In the preferred embodiment, a typical telephone data transfer rate is 14.4 kbps and allows a GPS data window of approximately two milliseconds every approximately three seconds. The size of the window may be adjusted by compressing audio data or the GPS data using widely known data compression techniques. Because of GPS data's low sensitivity to bit errors, efficient high performance compression techniques may be used.

During critical periods, such as when police, fire or medical assistance is urgently needed, accurate and immediate position information may become necessary. Thus, in a preferred embodiment of the invention, the GPS data rate transmitted along data path 144 may be increased to exceed the example data rates described in the preceding description. Transmitting additional GPS data allows for (1) more rapid acquisition of data, (2) more accurate computation of transmitter position, (3) more robust system allowing for drop outs of GPS data and (4) an allowance for higher mobile handset movements including acceleration and other dynamics. An increase in GPS sampling and data transmission rates may be requested by transferring an increased data rate request along signal path 136 from base station 140 to mobile communications unit 134. In alternative embodiments, mobile communications unit 134 may automatically increase the sample and transmission rate along data path 144 upon user entry of a certain sequence of numbers such as "911" or upon the detection of higher mobile handset dynamics such as increased acceleration which requires additional data points to determine position. In a preferred embodiment of the invention, base station 140 maintains control of the GPS data rate. Increasing the data transmission rate of GPS data improves the accuracy of the final position computation and improves the signal to noise ratio. Improvement of the signal to noise ratio is particularly needed when the mobile unit is shadowed from a GPS satellite resulting in attenuation and reduction of the GPS signal received.

Base station 140 includes a clock which is correlated to the GPS network system using a fourth GPS signal from a fourth satellite 164 transmitted along signal path 160. Use of a fourth GPS signal to compute a GPS time using the four polynomial equations 2 through 5 is well known and described by the previously described prior art references. Because the base station is stationary, the base station clock correction factor which is used to synchronize the base station clock to the GPS system, is very accurate.

In a preferred embodiment of the invention, each mobile unit simultaneously communicates with multiple base stations allowing multiple computations of the mobile unit position. Each computation may use a different geometric configuration of GPS satellites to produce a different solution. In order to increase the accuracy of the cellular tracking system, intelligent averaging techniques may be used to enhance the accuracy of the system by processing these multiple solutions.

As mobile unit 120 is tracked by multiple base stations, the multipath effects along links 136, 144 are different. The choice of base station for optimum position determination considers a number of factors. These factors include determining which base station provides minimum destructive or maximal constructive multipath interference. Base station locations are fixed. Thus the multipath environment, and hence the optimal base station selection, is nearly constant for a given mobile location. The high probability of using a particular base station for a particular mobile location allows the system to predict the optimal base station for the mobile unit to use based on the probabilistic trajectory of the mobile unit itself. The statistics of the trajectories are collected continuously for a given base station region. The collection of statistics and the fact that many of the routes are predetermined, due to the use of roads, railway tracks, and sidewalks, results in highly accurate predictions. Prediction and selection of optimum base stations result in less transmitting power required of the mobile unit and reduced computation time.

FIG. 2 illustrates a preferred embodiment of a mobile communications unit 200. The mobile communications unit 200 includes a keypad 208 for entering numeric data, a microphone 212 to receive audio signals and a speaker 216 to output audio signals. An integrated antenna 220 receives transmitted radio signals, typically carrying audio information, as well as GPS signals and transmits the received signals to a processor circuit 224. The processor circuit converts the received radio signals to audio data for speaker 216. Received GPS data is time stamped as will be illustrated in FIG. 4 and appropriately processed for retransmission through integrated antenna 220. Processing circuit 224 processes data received from microphone 212 for transmission using established cellular protocols.

FIG. 3 is a block level diagram illustrating circuitry implemented within the mobile communications device 200. Antenna 220 of the mobile communications device receives communication signals from a base station. The communication signals typically carry telephone voice data and may be transmitted in an analog or a digital form to antenna 220.

When the received communication signals are in digital form, the received signals are transmitted to processor 304 for analysis and processing. Processor 304 outputs the appropriate portions of communications data which represents audio signals to a digital to analog (D/A) converter 316 which converts the received digital audio data to an analog signal. The analog signal is transmitted to speaker 320 which outputs the data to a human ear.

Receiving circuit 308 also processes received timing data. In particular, a synchronization signal from the base station is used to detect frequency errors. Receiving circuit 308 uses the synchronization signal to adjust and synchronize an oscillator 312 with the base station. The synchronization of the oscillator 312 with a base station occurs in many different protocols including phone systems which utilize CDMA, AMPS, PDC, IS-136 and GSM protocols. For example, in GSM the oscillator system is synchronized to the base station reference within a two microsecond tolerance.

In addition to receiving audio and timing data, processor 304 receives GPS data. Antenna 324 in combination with GPS receiver 328 receives GPS signals from a plurality of GPS satellites. A digital data buffer 332 stores the digitized GPS data until needed by processor 304. Processor 304 samples the GPS data stored in digital data buffer 332 and associates the GPS data with a time stamp. In the preferred embodiment of the invention, the processor receives timing signals used to generate the time stamp from a timing apparatus. In the illustrated embodiment, the timing apparatus includes a multi-MHz clock oscillator 312. The time stamp is packetized with samples of GPS data from digital data buffer 332. The sample of GPS data with the time stamp permits determination of communications device position. The base station determines the data transfer rate and thus the sample size or the number of samples of GPS data.

Processor 304 also receives digitized audio information and/or externally supplied digital data from an external source such as a personal computer or fax machine. Microphone 340 receives sound signals such as a voice signal. An analog to digital (A/D) converter 344 converts the output of microphone 340 into a digital signal for processing by processor 304. The external data port interface 350 connects to external sources and buffers the incoming external data for processing by processor 304.

Processor 304 combines the digital audio data from A/D converter 344, the output from keypad 348, the digital data from the external data port interface 350 and the packetized GPS data with a time stamp into an information stream appropriate for transmission. The information stream may conform to a variety of protocols, including, but not limited to, GSM, CDMA or other well-known communication protocols. In a preferred embodiment, the GPS data is transmitted in the data stream of the communications protocol. Processor 304 outputs the communications stream to a transmit circuit 348 which transmits the data to a receiving unit at a base station as illustrated in FIG. 2.

FIG. 4 illustrates one example of a data frame 404 portion of an information packet transmitted by the mobile communications unit. Section 408 of data frame 404 contains a sample of GPS data received from GPS satellites. Section 412 of data frame 404 contains a word of real time clock information. The "real time clock" in a preferred embodiment of the invention is a 32 KHz clock that maintains an absolute real time, including the time of day and a date. In a preferred embodiment of the invention, the real time clock is set at a factory and powered by a battery which is installed at the factory. Data frame 404 also includes an oscillator timing signal 416 from the reference oscillator. In a preferred embodiment, the reference oscillator is oscillating at 26 MHz and locked to the base station using an automatic frequency control (AFC) mechanism or phase lock loop system. In GSM, the reference oscillator is typically synchronized within 2 microseconds of the base station clock. CDMA protocols call for an even closer synchronization between the reference oscillator and the base station.

Data frame 404 is periodically transmitted to the base station to enable the base station to determine the location of the mobile communications unit. In a preferred embodiment of the invention, information is transmitted at an average rate of approximately 1.4 Kb per second although the maximum amount of information that may be transmitted in emergency situations may be significantly increased to periodically exceed 171.2 K bits per second.

Figure 5:
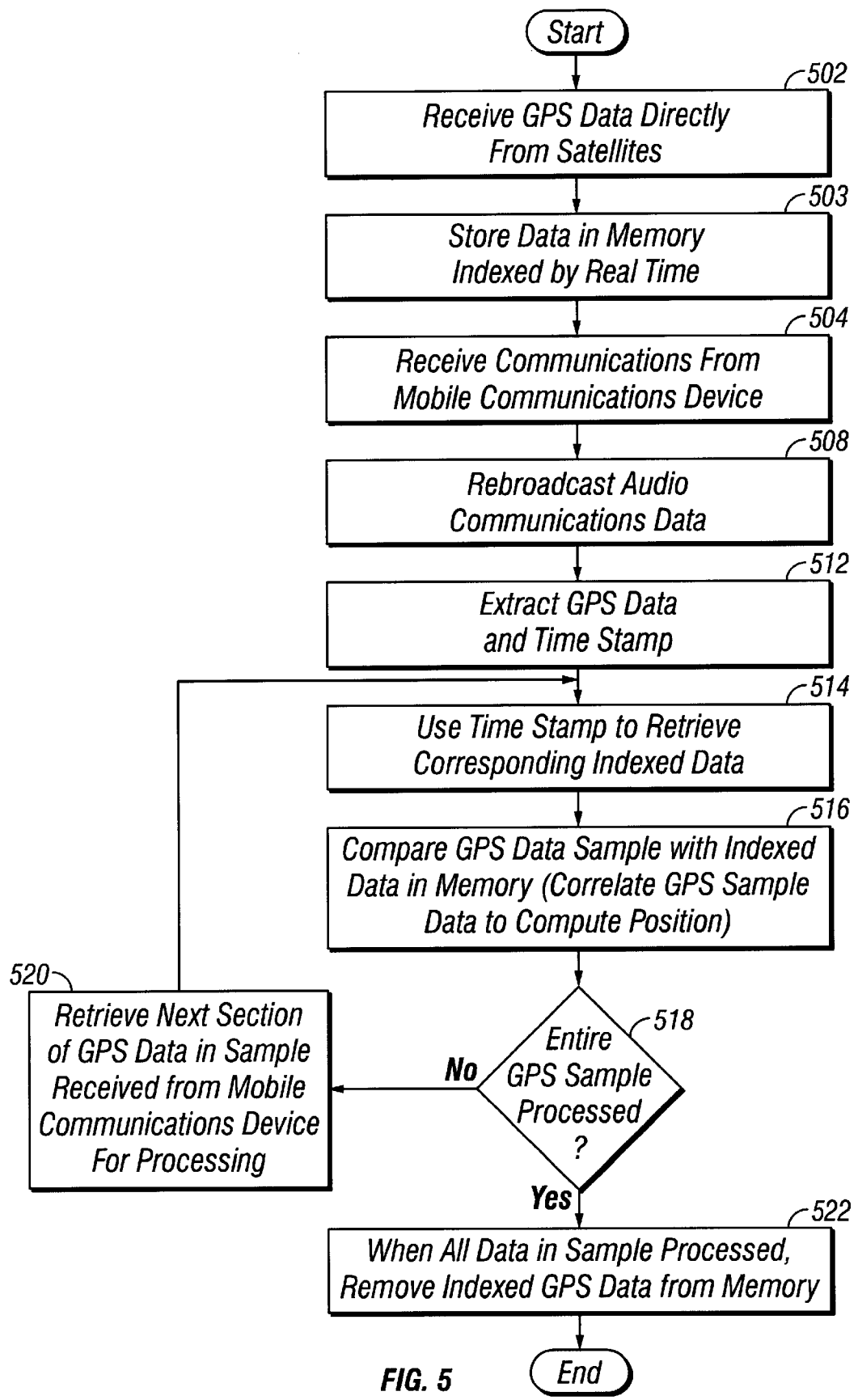
FIG. 5 is a flow diagram illustrating base station processing of received signals in accordance with the present invention.

FIG. 5 is a flow diagram illustrating the base station processing of packets of GPS data samples received from the mobile unit and GPS satellites. In block 502, the base station receives data directly from GPS satellites. The base station indexes the received GPS data according to the time the data was received and stores the indexed data in memory in block 503.

In block 504, the base station receives a communication signal from a mobile communications unit. In block 508, a processor in the base station rebroadcasts the audio data to another mobile communications unit, such as a receiving cellular telephone. In block 512, the base station extracts GPS data samples and corresponding time stamps.

The processor uses the time stamp to retrieve GPS data stored in its indexed memory in block 514. In block 516, the processor retrieves and correlates two sets of GPS data, the GPS data sample received by the mobile unit at a particular point in time and a corresponding set of GPS data retrieved from indexed memory and received at the base station at the same point in time. One method of correlation uses two clocks to shift the two sets of GPS data adjusting the phase difference between the two clocks until a local maximum integrated correlation results indicating an alignment of phase.

In blocks 518 and 520, the determination of pseudo ranges is repeated until each satellite signal in the sample of GPS data is processed. When an "age" of indexed data exceeds the maximum latency of processing data transmitted by the mobile communications units serviced by the base station, the older indexed data is removed from memory in block 522.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A mobile communications device comprising:
  a timing apparatus to output a time stamp, the timing apparatus synchronized to a base station timing reference;
  an antenna to receive and output GPS data transmitted from at least one GPS satellite;
  a GPS receiving circuit coupled to the antenna and timing apparatus to sample the GPS data and combine a GPS data sample with e time stamp to form a data packet; and
  a transmission circuit to transmit a plurality of data packets for periodic determination of the position of the mobile communications device at a sampling rate for correlation with data at a base station, the data at said base station being retrieved from a memory of the base station which data was received at the base station at the same time.

2. The mobile communications device of claim 1 wherein a frequency of the timing apparatus is synchronized to within one parts per million of the base station timing reference frequency.

3. The mobile communications device of claim 1 wherein the timing apparatus further comprises:
  a real time clock which maintains an approximate time;
  an oscillator synchronized with the base station to determine an error in the real time clock; and
  wherein the time stamp includes data from both the real time lock and the oscillator.

4. The mobile communications device of claim 1 wherein the time stamp and the GPS data sample are packetized with digitized voice data.

5. The mobile communications device of claim 1 further comprising:
  a microphone to receive sound signals;
  an analog to digital converter coupled to the microphone to digitize the sound signals; and wherein the transmission circuit is coupled to the analog to digital converter to transmit packets including digitized sound signals, the GPS data sample and the time stamp.

6. The mobile communications device of claim 1 further comprising:

a prioritization circuit to increase a sampling and transmission rate of GPS data when a predetermined condition occurs.

7. The mobile communications device of claim 6 wherein the redetermined condition includes the entry of an emergency code in keypad.

8. A method of determining a position of a mobile transmitting unit comprising the acts of:

synchronizing a timing apparatus with a timing signal received from a base station;

receiving and taking a plurality of samples of a GPS signal from at least one GPS satellite for periodic determination of the position of the mobile transmitting unit;

associating each sample of the received GPS signal with a corresponding time stamp, the corresponding time stamp based on the timing apparatus and indicating when the sample of GPS data was received; and transmitting the plurality of samples of the GPS signal each with the corresponding time stamp to a base station for correlation with the data at the base station, the data at said base station being retrieved from a memory of the base station which data was received at the base station at the same time.

9. The method of claim 8 wherein the act of synchronizing is done using a phase lock loop system.

10. The method of claim 8 wherein the act of synchronizing synchronizes the timing apparatus to within two microseconds of a base station clock.

11. The method of claim 8 further comprising the acts of:

packetizing the sample of GPS signal with the corresponding time stamp on a data packet prior to transmission.

12. The method of claim 8 further comprising:

receiving audio data;

digitizing the audio data; and transmitting the digitized audio data with the sample of GPS signal and the corresponding time stamp to the base station.

13. The method of claim 8 further comprising:

detecting when an emergency situation occurs; and increasing the sampling rate when the emergency situation occurs.

14. A method of determining a position of a mobile communications device comprising:

receiving GPS signals from at least one GPS satellite at a first station;

storing the GPS signals as GPS signal segments in a memory;

indexing each GPS signal segment with a corresponding index indicating a time when the GPS signal segment was received;

receiving a plurality of GPS samples and each sample associated with a corresponding time stamp from a mobile communications device;

matching GPS signal segments to corresponding GPS samples having time stamps corresponding to the index of each GPS segment; and determining what time the GPS sample was received using the matching GPS signal segment.

15. The method of claim 14 further comprising:

correlating the GPS sample to determine a position of the mobile communications device transmitting the GPS sample.

16. The method of claim 14 further comprising:

receiving digitized audio signals with the GPS samples and forwarding the digitized audio signals to a second mobile communications device.

* * * * *